United States Patent [19]
Meyer et al.

[11] Patent Number: 5,293,685
[45] Date of Patent: Mar. 15, 1994

[54] METHOD OF MAKING SLIDE VALVES WITH TAPPETS AND THE SLIDE VALVES

[75] Inventors: Hans-Friedrich Meyer, Gehrden; Ernst A. Meyer, Wennigsen, both of Fed. Rep. of Germany

[73] Assignee: Mannesmann Aktiengesellschaft, Düsseldorf, Fed. Rep. of Germany

[21] Appl. No.: 943,340

[22] Filed: Sep. 10, 1992

[30] Foreign Application Priority Data

Sep. 19, 1991 [DE] Fed. Rep. of Germany ....... 4131830

[51] Int. Cl.⁵ ............................................. B23P 15/00
[52] U.S. Cl. ........................... 29/890.124; 29/890.127; 137/625.69
[58] Field of Search ..................... 29/890.124, 890.127, 29/888.43; 264/219; 137/625.69

[56] References Cited

U.S. PATENT DOCUMENTS

| | | | |
|---|---|---|---|
| 3,472,281 | 10/1969 | Chiba et al. | 137/625.69 |
| 3,477,472 | 11/1969 | Mercier | 137/625.69 |
| 3,762,443 | 10/1973 | Sorenson | 137/625.69 |
| 3,844,531 | 10/1974 | Grengs | 29/890.127 |
| 3,976,103 | 8/1976 | Ostic | 137/625.69 |
| 4,337,797 | 7/1982 | Caruso | 137/625.69 |
| 4,388,949 | 6/1983 | Bonney | 137/625.69 |
| 4,705,058 | 11/1987 | Marklew | 29/890.127 |
| 4,844,412 | 7/1989 | Kubozono | 137/625.69 |
| 4,926,906 | 5/1990 | Ichihashi et al. | 137/625.69 |
| 5,123,450 | 6/1992 | Wood et al. | 137/625.69 |

FOREIGN PATENT DOCUMENTS 3149306 6/1983 Fed. Rep. of Germany .
3422073 12/1984 Fed. Rep. of Germany .

OTHER PUBLICATIONS

Dipl.-Ing. Hans F. Meyer; *Fluid*; "Keramik und Kunststoff im Kommen"; 1988; pp. 38 and 43.

Du Pont de Nemours (Deutschland) GmbH, D-4000 Düsseldorf 30; *Technica*; "Teflon schützt Kugelventil"; Oct. 1987; p. 63.

*Primary Examiner*—Irene Cuda
*Attorney, Agent, or Firm*—Nils H. Ljungman & Associates

[57] ABSTRACT

A tappet for slide valves, in particular for pneumatic multi-way valves, is generally made of steel and has a basic cylindrical shape with control segments located on the basic cylindrical shape and with smaller-diameter intermediate segments, whereby control edges are formed at the transitions between the segments. To be able to manufacture a lightweight tappet using more economical methods, the tappet body is made of plastic and is hollow all the way through, the outer control segments and the smaller-diameter segments between the outer control segments have wall thicknesses which are equal for each type of segment, and the plastic comprise polyoxymethylene or polyamide with a proportion of fillers.

20 Claims, 2 Drawing Sheets

METHOD OF MAKING SLIDE VALVES WITH TAPPETS AND THE SLIDE VALVES

BACKGROUND OF THE INVENTION

1. Field of the Invention

The invention relates to a method of making slide valves with tappets and the slide valves.

2. Background Information

Inside slide valves that may be known there are tappets made of steel, aluminum or brass with a nickel coating. On account of the specific weight or density of steel, such tappets are very heavy and require high acceleration and deceleration forces. Consequently, strong drive mechanisms are necessary for such tappets. In addition, after manufacture, steel tappets must be reground by lathe turning and plunge cutting, such as, deep grooving of the reduced diameter segments to obtain a specified surface quality. Steel tappets also experience problems with friction and thus abrasion and wear, which limits their useful life. Nor are steel tappets protected against aggressive media, unless correspondingly expensive alloys are used. Overall, therefore, tappets made of metal are expensive and heavy.

The advantages of the invention include a tappet which is lighter in weight than metal tappets, conserves raw materials and can be manufactured by injection molding, as well as the fact that the composition of the material offers a high-strength surface, a high-quality surface with low abrasive wear characteristics and thus a long useful life.

On account of the wall thickness conditions, the injection molding manufacturing process can be carried out with practically no flash. Otherwise, the flash would be technically unavoidable, making the use of a plastic tappet not possible. The friction characteristics of the tappet as a sliding element are also easier to influence if plastics are used than if steel is used.

In accordance with additional characteristics of the invention, the manufacture of the hydraulic or pneumatic control element is facilitated by the fact that the walls of the control segments and the smaller-diameter intermediate segments have a rounded curve in the hollow interior space.

An additional feature which facilitates the manufacture of a plastic tappet is that the injection points required for the manufacture in the injection mold are located in the vicinity of the rounded curve in the hollow interior space.

The weight, strength, surface quality, surface hardness, absence of flash, etc. are also influenced by the fact that the fillers added to the polyoxymethylene or polyamide comprise or consist of silicon, Teflon and/or molybdenum.

It is advantageous if either 0 to 15% silicon or 0 to 50% Teflon is added to the polyoxymethylene.

OBJECT OF THE INVENTION

The object of the invention disclosed herein relates to a tappet which is lighter and can be manufactured more economically than tappets previously known, and which has a long useful life.

SUMMARY OF THE INVENTION

A tappet for slide valves, in particular for pneumatic multi-way valves, is generally made of steel and has a basic cylindrical shape with control segments located on the basic cylindrical shape and with smaller-diameter intermediate segments, whereby control edges are formed at the transitions between the segments.

To be able to manufacture a lightweight tappet using more economical methods, the invention proposes that the tappet body be made of plastic and be hollow all the way through, that the outer control segments and the smaller-diameter segments between them have wall thicknesses which are equal for each type of segment, and that the plastic comprise or consist of polyoxymethylene or polyamide with a proportion of fillers.

One aspect of the invention resides broadly in a method of making a slide valve with a tappet, the method comprising the steps a), b), c) and d) as follows. Step a) is providing a slide valve body. Step b) is providing an injection molding machine. Step c) is molding a tappet comprising the steps c1), c2), c3), c4) and c5) as follows. Step c1) is providing a mold for the injection molding machine by forming the mold such that the mold is configured to form a body such that the body: has a cylindrical shape with two ends and end segments at the ends; has at least one intermediate segment between the end segments; and has a hollow interior space; the end segments being cylindrical, the end segments being coaxial with one another, the end segments having at least one diameter, and the end segments having walls which walls have thicknesses and which thicknesses are substantially equal; the at least one intermediate segment being cylindrical, the at least one intermediate segment being coaxial with the end segments, the at least one intermediate segment having a diameter which diameter is smaller than the at least one diameter of the end segments, and the at least one intermediate segment having a wall which wall has a thickness. Step c2) is providing a plastic material. Step c3) is inserting the mold in the injection molding machine. Step c4) is inserting the plastic material in the injection molding machine. Step c5) is operating the injection molding machine to mold the tappet from the plastic material in the mold, which tappet comprises: two ends; end segments at the ends; and at least one intermediate segment between the end segments; the tappet having a cylindrical shape; the tappet having a hollow interior space; the end segments being cylindrical, the end segments being coaxial with one another, the end segments having at least one diameter, and the end segments having walls which walls have thicknesses and which thicknesses are substantially equal; the at least one intermediate segment being cylindrical, the at least one intermediate segment being coaxial with the end segments, the at least one intermediate segment having a diameter which diameter is smaller than the at least one diameter of the end segments, and the at least one intermediate segment having a wall which wall has a thickness. Step d) is assembling a slide valve comprising inserting the tappet into the slide valve body.

Another aspect of the invention resides broadly in a slide valve with a tappet made by a method, the method comprising the steps a), b), c) and d) as follows. Step a) is providing a slide valve body. Step b) is providing an injection molding machine Step c) is molding a tappet comprising the steps c1), c2), c3), c4) and c5) as follows. Step c1) is providing a mold for the injection molding machine by forming the mold such that the mold is configured to form a body such that the body: has a cylindrical shape with two ends and end segments at the ends; has at least one intermediate segment between the end segments; and has a hollow interior space; the end segments being cylindrical, the end segments being coaxial with one another, the end segments having at least one diameter, and the end segments having walls which walls have thicknesses and which thicknesses are substantially equal; the at least one intermediate segment being cylindrical, the at least one intermediate segment being coaxial with the end segments, the at least one intermediate segment having a diameter which diameter is smaller than the at least one diameter of the end segments, and the at least one intermediate segment having a wall which wall has a thickness. Step c2) is providing a plastic material. Step c3) is inserting the mold in the injection molding machine. Step c4) is inserting the plastic material in the injection molding machine. Step c5) is operating the injection molding machine to mold the tappet from the plastic material in the mold, which tappet comprises: two ends; end segments at the ends; and at least one intermediate segment between the end segments; the tappet having a cylindrical shape; the tappet having a hollow interior space; the end segments being cylindrical, the end segments being coaxial with one another, the end segments having at least one diameter, and the end segments having walls which walls have thicknesses and which thicknesses are substantially equal; the at least one intermediate segment being cylindrical, the at least one intermediate segment being coaxial with the end segments, the at least one intermediate segment having a diameter which diameter is smaller than the at least one diameter of the end segments, and the at least one intermediate segment having a wall which wall has a thickness. Step d) is assembling a slide valve comprising inserting the tappet into the slide valve body.

BRIEF DESCRIPTION OF THE DRAWINGS

One embodiment of the invention is illustrated in the accompanying drawings, and is explained below in greater detail.

FIG. 2 shows a detail on an enlarged scale (the inner rounded curve) of the tappet illustrated in FIGS. 1 and 1a; and FIG. 3 shows a detail on an enlarged scale (the control edge) of the tappet illustrated in FIGS. 1 and 1a.

DESCRIPTION OF THE PREFERRED EMBODIMENT

Figure 1:
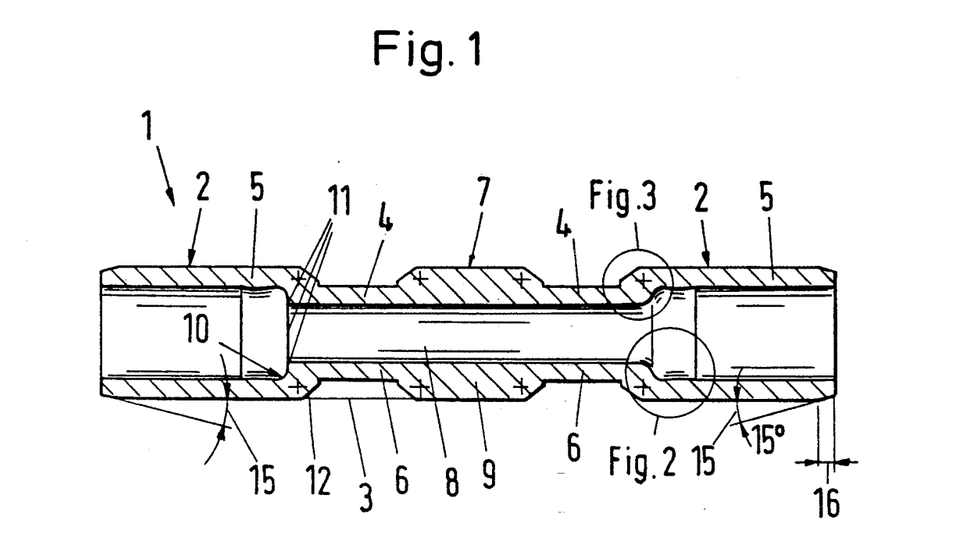
FIG. 1 shows an axial longitudinal section through a plastic tappet.
Figure 1A:
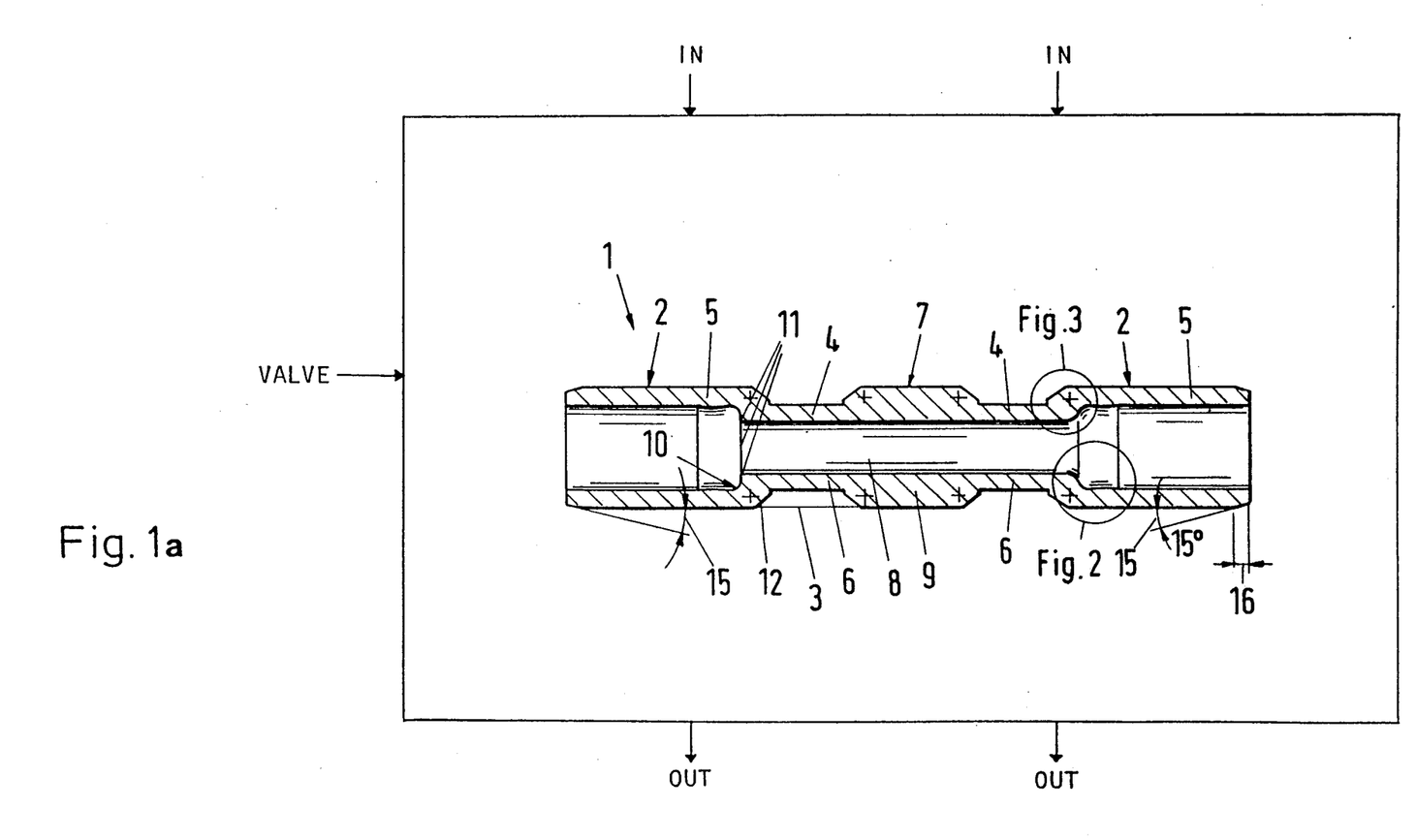
FIG. 1a shows a plastic tappet in a valve.

FIG. 1a shows a plastic tappet in a valve with input and output connections.

The tappet, as a pneumatic or hydraulic control element for slide valves, is intended in particular for pneumatic multi-way valves. A tappet body 1 has cylindrical control segments 2, which lie on a cylindrical base shape 3. The control segments 2, however, can also have different diameters, e.g. stepped diameters. Between the control segments 2 are smaller-diameter intermediate segments 4. Both the external control segments 2 and the intermediate segments 4 have walls 5 and 6, respectively, which are of uniform thickness for each type of segment. Advantageously and to simplify the manufacturing process, there is a central control segment 7 having the combined thickness of the walls 5 and 6, to produce a smooth, continuous hollow interior space 8. A center wall 9 is therefore approximately twice as thick as each of the walls 5 and 6.

In other words, the central control segment 7 preferably has a diameter substantially equal to the diameter of the control segments 2. Preferably the hollow interior space 8 has substantially the same diameter at the central control segment 7 as it has at the intermediate segments 4.

Figure 2:
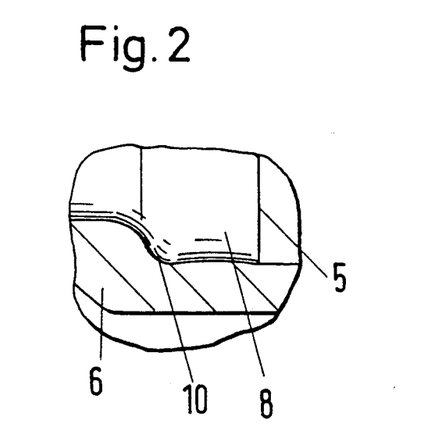

As shown in FIG. 2, in the hollow inner space 8 of the transition between the wall 5 and the wall 6, there is a rounded curve 10 to promote the flow of injected plastic material.

As shown in FIG. 2, the rounded curve 10 may have a concave portion adjacent to the wall 5 of the adjacent control segment 2. The rounded curve 10 may have a convex portion adjacent to the wall 6 of the adjacent intermediate segment 4. The concave portion and the convex portion are preferably parallel at the intersection of the concave portion and the convex portion. The rounded curve 10 is preferably smooth. As shown in FIGS. 1 and 1a, the walls 6 of the intermediate segments 4 may possibly be extended to meet the concave portion at at least part of the transition, so that there may possibly be no rounded convex portion at at least part of the transition. These possible extensions of the walls 6 of the intermediate segments 4 might be due to the injection points 11 near the rounded curve 10.

A portion of wall 5 adjacent to the rounded curve 10 might be slightly thickened by a possible small, smoothly-curved, convex thickening on the inner face of wall 5.

In addition, the injection points 11 required for manufacture in the injection mold ar located in the vicinity of the rounded curve 10 in the hollow interior space 8, as shown in FIGS. 1 and 1a. The plastic, comprising or consisting of polyoxymethylene or polyamide with silicon, Teflon and/or molybdenum sulfide fillers, flows under technically favorable conditions into the mold having a shape corresponding to the body of the tappet 1.

The crosses in FIGS. 1 and 1a may indicate possible injection points, and in at least one embodiment of the invention do indicate injection points. The plastic might be injected at at least one of these possible injection points, and in at least one embodiment of the invention plastic is injected at at least one of these possible injection points.

Figure 3:
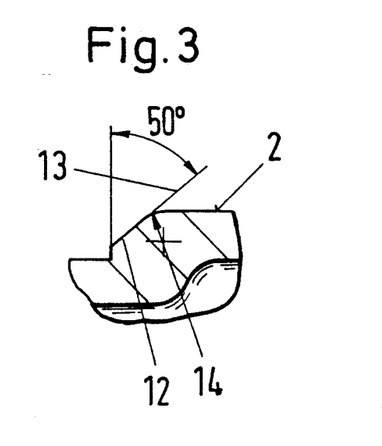

As shown in FIG. 3, all the control edges 12 are designed on a slant 13, e.g. 50 degrees, whereby here again, there is a transition from the slant 13 through a curve 14 to the basic cylindrical shape. Here too there is a favorable flow of the injected plastic material along the slant 13 and the curve 14 on one side of the cavity bounded by the mold walls, and along the rounded curve 10, which in the tappet is next to the hollow interior space 8, on the other side of the cavity.

In other words, the control edges 12 might have a surface comprising three annular sections. The first annular section is preferably flat. The first annular section may extend outward from the intermediate segment 4. Preferably the first annular section extends radially outward from the intermediate segment 4 at an angle of approximately 90°. The second annular section is preferably flat. The second annular section may extend outward from the first annular section. The angle between the second annular section and the first annular section is preferably approximately 50°. The third annular section is preferably curved and convex. The third annular section preferably joins the second annular section and the outer surface of the wall 5 of the control segment 2. The third annular section is preferably the surface that would be obtained by rounding off an edge between the second annular section and the outer surface of the wall 5 of control segment 2. Therefore, the third annular section is preferably parallel to the second annular section at one end of the third annular section, and the third annular section is preferably parallel to the outer surface of the wall 5 of control segment 2 at the other end of the third annular section.

To make possible an easy insertion of the body of the tappet 1 between the gaskets of a slide valve, chamfers 15 having a width 16 are provided on the ends of the tappet body 1. These chamfers 15 have preferably an angle of 15°.

The width 16 of the chamfers 15 may be approximately equal to the thickness of the walls 5 of the end segments 2.

Possible examples of pneumatic or hydraulic valves in which tappets made according to the present invention might be used may be found in U.S. Pat. No. 4,644,971, issued Feb. 24, 1987, entitled "High Pressure Pilot Operated Valve"; U.S. Pat. No. 4,936,714, issued Jun. 26, 1990, entitled "Valve Devices for Use with Mining Equipment"; U.S. Pat. No. 4,976,286, issued Dec. 11, 1990, entitled "Four-way Slide Valve"; U.S. Pat. No. 5,056,551, issued Oct. 15, 1991, entitled "Fast Acting Multiple Element Valve"; and U.S. Pat. No. 5,105,861, issued Apr. 21, 1992, entitled "Filling Valve for the Portioned Drawing Off of Freeflowing Products". Possible examples of devices and methods which might be used in making the tappet of the present invention may be found in U.S. Pat. No. 4,165,062, issued Aug. 21, 1979, entitled "Mold with Porous Cavity Vent"; U.S. Pat. No. 4,249,874, issued Feb. 10, 1981, entitled "Insert Molding Apparatus with Movable Flash Barrier"; U.S. Pat. No. 4,372,740, issued Feb. 8, 1983, entitled "Molding Apparatus"; U.S. Pat. No. 4,522,374, issued Jun. 11, 1985, entitled "Valve Spool"; and U.S. Pat. No. 4,575,443, issued Mar. 11, 1986, entitled "Rotary Injection Molding System for Suppressing Polymer Flash". The above-cited U.S. patents are hereby incorporated by reference herein, as if set forth in their entirety.

One feature of the invention resides broadly in a tappet for slide valves, in particular for pneumatic multi-way valves, with smaller-diameter segments located between the control segments of a cylindrical base shape, whereby control edges are formed on the transitions between the segments, characterized by the fact that the tappet body 1 is made of plastic and is hollow all the way through, that the outer control segments 2 and the smaller-diameter segments 4 between them have walls 5,6 of the same thickness for each type of segment, and that the plastic consists of polyoxymethylene or polyamide with a proportion of fillers.

Another feature of the invention resides broadly in the tappet characterized by the fact that the walls 5,6 of the control segments 2 and of the smaller-diameter intermediate segments 4 have a rounded curve 10 in the hollow interior space 8.

Yet another feature of the invention resides broadly in the tappet characterized by the fact that the injection points 11 necessary for manufacture in the injection mold are located in the vicinity of the rounded curve 10 in the hollow interior space 8.

Still another feature of the invention resides in the tappet characterized by the fact that the fillers used with the polyoxymethylene or polyamide consist of silicon, Teflon and/or molybdenum sulfide.

Another feature of the invention resides broadly in the tappet characterized by the fact that either 0 to 15% silicon or 0 to 50% Teflon is added to the polyoxymethylene.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A method of making a slide valve with a tappet, said method comprising the steps of:
   a) providing a slide valve body;
   b) providing an injection molding machine;
   c) molding a tappet comprising the following steps:
      c1) providing a mold for the injection molding machine by forming the mold such that the mold is configured to form a body such that the body:
         has a cylindrical shape with two ends and end segments at the ends;
         has at least one intermediate segment between the end segments; and
         has a hollow interior space;
         the end segments being cylindrical, the end segments being coaxial with one another, the end segments having at least one diameter, and the end segments having walls which walls have thicknesses and which thicknesses are substantially equal;
         the at least one intermediate segment being cylindrical, the at least one intermediate segment being coaxial with the end segments, the at least one intermediate segment having a diameter which diameter is smaller than the at least one diameter of the end segments, and the at least one intermediate segment having a wall which wall has a thickness;
      c2) providing a plastic material;
      c3) inserting the mold in the injection molding machine;
      c4) inserting the plastic material in the injection molding machine; and
      c5) operating the injection molding machine to mold the tappet from the plastic material in the mold, which tappet comprises:
         two ends;
         end segments at the ends; and
         at least one intermediate segment between the end segments;
         the tappet having a cylindrical shape;
         the tappet having a hollow interior space;

the end segments being cylindrical, the end segments being coaxial with one another, the end segments having at least one diameter, and the end segments having walls which walls have thicknesses and which thicknesses are substantially equal;

the at least one intermediate segment being cylindrical, the at least one intermediate segment being coaxial with the end segments, the at least one intermediate segment having a diameter which diameter is smaller than the at least one diameter of the end segments, and the at least one intermediate segment having a wall which wall has a thickness; and d) assembling a slide valve comprising inserting the tappet into the slide valve body.

2. A method of making a slide valve with a tappet according to claim 1, wherein the mold formed in step c1) is further configured to form a body such that the at least one intermediate segment of the body comprises at least two intermediate segments which intermediate segments have walls which walls have thicknesses and which thicknesses are substantially equal; and the at least one intermediate segment of the tappet molded in step c5) comprises at least two intermediate segments which intermediate segments have walls which walls have thicknesses and which thicknesses are substantially equal.

3. A method of making a slide valve with a tappet according to claim 2, wherein the mold formed in step c1) is further configured to form a body such that the body further comprises control edges for controlling flow of a fluid through a slide valve, which control edges are positioned between the at least one intermediate segment of the body and the end segments of the body; and the tappet molded in step c5) further comprises control edges for controlling flow of a fluid through the slide valve, which control edges are positioned between the at least one intermediate segment of the tappet and the end segments of the tappet.

4. A method of making a slide valve with a tappet according to claim 3, wherein the plastic material provided in step c2) comprises one of: polyoxymethylene and polyamide; and the plastic material further comprises fillers.

5. A method of making a slide valve with a tappet according to claim 4, wherein the mold formed in step c1) is further configured to form a body such that the body has transitions which transitions join the end segments of the body and the at least two intermediate segments of the body and which transitions have curves; and the tappet molded in step c5) further comprises transitions which transitions join the end segments of the tappet and the at least two intermediate segments of the tappet and which transitions have curves.

6. A method of making a slide valve with a tappet according to claim 5, wherein the mold formed in step c1) is further configured to have at least one injection point and to have surfaces that form the curves of the transitions of the body which the mold is configured to form, the at least one injection point being positioned in the vicinity of the surfaces of the mold that form the curves of the transitions of the body which the mold is configured to form.

7. A method of making a slide valve with a tappet according to claim 6, wherein the fillers comprise at least one of: silicon, Teflon and molybdenum sulfide.

8. A method of making a slide valve with a tappet according to claim 7, wherein the fillers comprise one of: 0–15% silicon and 0–50% Teflon.

9. A method of making a slide valve with a tappet according to claim 8, wherein the injection molding machine provided in step b) is an injection molding machine for flashless molding;

the mold provided in step c1) is further configured such the body formed in the mold has no flash; and step c5) of operating the injection molding machine comprises operating the injection molding machine to mold the tappet such that the tappet has no flash.

10. A method of making a slide valve with a tappet according to claim 9, wherein the mold formed in step c1 is further configured to form a body such that:

the at least one intermediate segment of the body comprises two intermediate segments of the body;

the body has a central segment between the two intermediate segments of the body, the central segment being cylindrical, the central segment being coaxial with the end segments, the central segment having a wall which wall has a thickness which thickness is substantially the sum of the thickness of the wall of one of the intermediate segments of the body and the thickness of the wall of one of the end segments of the body;

each of the walls of the two intermediate segments of the body has an inner surface and an outer surface;

each of the walls of the end segments of the body has an inner surface and an outer surface;

the wall of the central segment of the body has an inner surface and an outer surface;

the control edges of the body comprise outer transitional surfaces joining the outer surfaces of the walls of the two intermediate segments of the body and the outer surfaces of the walls of the end segments of the body, and the control edges of the body further comprise outer transitional surfaces joining the outer surfaces of the walls of the two intermediate segments of the body and the outer surface of the wall of the central segment of the body;

each of the outer transitional surfaces of the body comprises a first annular surface, a second annular surface and a third annular surface, the first annular surface joining the outer surface of the wall of one of the two intermediate segments of the body and the second annular surface, the second annular surface joining the first annular surface and the third annular surface, the third annular surface of one of the outer transitional surfaces of the body joining the second annular surface and one of: the outer surface of the wall of one of the end segments of the body and the outer surface of the wall of the central segment of the body, the first annular surface having an inner edge and an outer edge, the inner edge of the first annular surface having a diameter, the outer edge of the first annular surface having a diameter, the diameter of the outer edge of the first annular surface being greater than the diameter of the inner edge of the first annular surface, the inner edge of the first annular surface being adjacent to the outer surface of the wall of one of the two intermediate segments of the body, and the first annular surface extending radially outward at an angle of approximately 90° from the outer surface of the wall of the one of the two intermediate segments of the body, the second annular surface having an inner edge and an outer edge, the inner edge of the second annular surface having a diameter, the outer edge of the second annular surface having a diameter, the diameter of the outer edge of the second annular surface being greater than the diameter of the inner edge of the second annular surface, the inner edge of the second annular surface being adjacent to the outer edge of the first annular surface, the second annular surface not overlapping the first annular surface, and the second annular surface being inclined substantially 50° from the first annular surface, and the third annular surface having an inner edge and an outer edge, the inner edge of the third annular surface having a diameter, the outer edge of the third annular surface having a diameter, the diameter of the outer edge of the third annular surface being greater than the diameter of the inner edge of the third annular surface, the inner edge of the third annular surface being adjacent to the outer edge of the second annular surface, the third annular surface being curved and convex, the third annular surface at the inner edge of the third annular surface being parallel to the second annular surface, and the third annular surface at the outer edge of the third annular surface being parallel to one of: the outer surface of the wall of the one of the end segments of the body and the outer surface of the wall of the central segment of the body; the body has a longitudinal axis;

the body has a length along the longitudinal axis of the body;

the hollow interior space of the body extends over the entire length of the body;

the body has inner transitional surfaces joining the inner surfaces of the walls of the two intermediate segments of the body and the inner surfaces of the walls of the end segments of the body;

each of the inner transitional surfaces of the body comprises a first portion and a second portion, the first portion joining the inner surface of the wall of the one of the two intermediate segments of the body and the second portion, the second portion joining the first portion and the inner surface of the wall of one of the end segments of the body, the first portion being curved and convex, the first portion having a first edge and a second edge, the first edge of the first portion being adjacent to the inner surface of the wall of the one of the two intermediate segments of the body, and the first portion at the first edge of the first portion being parallel to the inner surface of the wall of the one of the two intermediate segments of the body, and the second portion being curved and concave, the second portion having a first edge and a second edge, the first edge of the second portion being adjacent to the second edge of the first portion, the second portion at the first edge of the second portion being substantially aligned with the first portion, the second edge of the second portion being adjacent to the inner surface of the wall of the one of the end segments of the body, and the second portion at the second edge of the second portion being substantially aligned with the inner surface of the wall of the one of the end segments of the body;

the body has chamfers at the ends of the body on the outer surfaces of the walls of the end segments of the body which chamfers are inclined substantially 15° from the outer surfaces of the walls of the end segments of the body, and which chamfers extend a distance from the ends of the body which distance is substantially equal to the thickness of one of the end segments of the body;

the inner surface of the wall of the central segment of the body has a diameter, the inner surfaces of the walls of the two intermediate segments of the body have diameters which diameters are substantially equal to one another and are substantially equal to the diameter of the inner surface of the wall of the central segment of the body;

each of the end segments of the body has a length along the longitudinal axis of the body;

each of the end segments of the body has an end adjacent to one of the inner transitional surfaces of the body and an end at one of the ends of the body; and the wall of each of the end segments of the body has a convex thickening on the inner surface of the wall of the end segment which thickening begins at the end of the end segment adjacent to one of the inner transitional surfaces of the body and which thickening extends approximately one fourth of the length of the end segment toward the end of the end segment at one of the ends of the body; and the tappet molded in step c5 is molded such that:

the at least one intermediate segment of the tappet comprises two intermediate segments of the tappet;

the tappet comprises a central segment between the two intermediate segments of the tappet, the central segment being cylindrical, the central segment being coaxial with the end segments, the central segment having a wall which wall has a thickness which thickness is substantially the sum of the thickness of the wall of one of the intermediate segments of the tappet and the thickness of the wall of one of the end segments of the tappet;

each of the walls of the two intermediate segments of the tappet has an inner surface and an outer surface;

each of the walls of the end segments of the tappet has an inner surface and an outer surface;

the wall of the central segment of the tappet has an inner surface and an outer surface;

the control edges of the tappet comprise outer transitional surfaces joining the outer surfaces of the walls of the two intermediate segments of the tappet and the outer surfaces of the walls of the end segments of the tappet, and the control edges of the tappet further comprise outer transitional surfaces joining the outer surfaces of the walls of the two intermediate segments of the tappet and the outer surface of the wall of the central segment of the tappet;

each of the outer transitional surfaces of the tappet comprises a first annular surface, a second annular surface and a third annular surface, the first annular surface joining the outer surface of the wall of one of the two intermediate segments of the tappet and the second annular surface, the second annular surface joining the first annular surface and the third annular surface, the third annular surface of one of the outer transitional surfaces of the tappet joining the second annular surface and one of: the outer surface of the wall of one of the end segments of the tappet and the outer surface of the wall of the central segment of the tappet, the first annular surface having an inner edge and an outer edge, the inner edge of the first annular surface having a diameter, the outer edge of the first annular surface having a diameter, the diameter of the outer edge of the first annular surface being greater than the diameter of the inner edge of the first annular surface, the inner edge of the first annular surface being adjacent to the outer surface of the wall of one of the two intermediate segments of the tappet, and the first annular surface extending radially outward at an angle of approximately 90° from the outer surface of the wall of the one of the two intermediate segments of the tappet, the second annular surface having an inner edge and an outer edge, the inner edge of the second annular surface having a diameter, the outer edge of the second annular surface having a diameter, the diameter of the outer edge of the second annular surface being greater than the diameter of the inner edge of the second annular surface, the inner edge of the second annular surface being adjacent to the outer edge of the first annular surface, the second annular surface not overlapping the first annular surface, and the second annular surface being inclined substantially 50° from the first annular surface, and the third annular surface having an inner edge and an outer edge, the inner edge of the third annular surface having a diameter, the outer edge of the third annular surface having a diameter, the diameter of the outer edge of the third annular surface being greater than the diameter of the inner edge of the third annular surface, the inner edge of the third annular surface being adjacent to the outer edge of the second annular surface, the third annular surface being curved and convex, the third annular surface at the inner edge of the third annular surface being parallel to the second annular surface, and the third annular surface at the outer edge of the third annular surface being parallel to one of: the outer surface of the wall of the one of the end segments of the tappet and the outer surface of the wall of the central segment of the tappet;

the tappet has a longitudinal axis;

the tappet has a length along the longitudinal axis of the tappet;

the hollow interior space of the tappet extends over the entire length of the tappet;

the tappet has inner transitional surfaces joining the inner surfaces of the walls of the two intermediate segments of the tappet and the inner surfaces of the walls of the end segments of the tappet;

each of the inner transitional surfaces of the tappet comprises a first portion and a second portion, the first portion joining the inner surface of the wall of the one of the two intermediate segments of the tappet and the second portion, the second portion joining the first portion and the inner surface of the wall of one of the end segments of the tappet, the first portion being curved and convex, the first portion having a first edge and a second edge, the first edge of the first portion being adjacent to the inner surface of the wall of the one of the two intermediate segments of the tappet, and the first portion at the first edge of the first portion being parallel to the inner surface of the wall of the one of the two intermediate segments of the tappet, and the second portion being curved and concave, the second portion having a first edge and a second edge, the first edge of the second portion being adjacent to the second edge of the first portion, the second portion at the first edge of the second portion being substantially aligned with the first portion, the second edge of the second portion being adjacent to the inner surface of the wall of the one of the end segments of the tappet, and the second portion at the second edge of the second portion being substantially aligned with the inner surface of the wall of the one of the end segments of the tappet;

the tappet has chamfers at the ends of the tappet on the outer surfaces of the walls of the end segments of the tappet which chamfers are inclined substantially 15° from the outer surfaces of the walls of the end segments of the tappet, and which chamfers extend a distance from the ends of the tappet which distance is substantially equal to the thickness of one of the end segments of the tappet;

the inner surface of the wall of the central segment of the tappet has a diameter, the inner surfaces of the walls of the two intermediate segments of the tappet have diameters which diameters are substantially equal to one another and are substantially equal to the diameter of the inner surface of the wall of the central segment of the tappet;

each of the end segments of the tappet has a length along the longitudinal axis of the tappet;

each of the end segments of the tappet has an end adjacent to one of the inner transitional surfaces of the tappet and an end at one of the ends of the tappet; and the wall of each of the end segments of the tappet has a convex thickening on the inner surface of the wall of the end segment which thickening begins at the end of the end segment adjacent to one of the inner transitional surfaces of the tappet and which thickening extends approximately one fourth of the length of the end segment toward the end of the end segment at one of the ends of the tappet.

11. A slide valve with a tappet made by a method comprising the steps of:
a) providing a slide valve body;
b) providing an injection molding machine;
c) molding a tappet comprising the following steps:
c1) providing a mold for the injection molding machine by forming the mold such that the mold is configured to form a body such that the body:
has a cylindrical shape with two ends and end segments at the ends;

has at least one intermediate segment between the end segments; and has a hollow interior space;

the end segments being cylindrical, the end segments being coaxial with one another, the end segments having at least one diameter, and the end segments having walls which walls have thicknesses and which thicknesses are substantially equal;

the at least one intermediate segment being cylindrical, the at least one intermediate segment being coaxial with the end segments, the at least one intermediate segment having a diameter which diameter is smaller than the at least one diameter of the end segments, and the at least one intermediate segment having a wall which wall has a thickness;

c2) providing a plastic material;

c3) inserting the mold in the injection molding machine;

c4) inserting the plastic material in the injection molding machine; and c5) operating the injection molding machine to mold the tappet from the plastic material in the mold, which tappet comprises:

two ends;

end segments at the ends; and at least one intermediate segment between the end segments;

the tappet having a cylindrical shape;

the tappet having a hollow interior space;

the end segments being cylindrical, the end segments being coaxial with one another, the end segments having at least one diameter, and the end segments having walls which walls have thicknesses and which thicknesses are substantially equal;

the at least one intermediate segment being cylindrical, the at least one intermediate segment being coaxial with the end segments, the at least one intermediate segment having a diameter which diameter is smaller than the at least one diameter of the end segments, and the at least one intermediate segment having a wall which wall has a thickness; and d) assembling a slide valve comprising inserting the tappet into the slide valve body.

12. The tappet according to claim 11, wherein the mold formed in step c1) is further configured to form a body such that the at least one intermediate segment of the body comprises at least two intermediate segments which intermediate segments have walls which walls have thicknesses and which thicknesses are substantially equal; and the at least one intermediate segment of the tappet molded in step c5) comprises at least two intermediate segments which intermediate segments have walls which walls have thicknesses and which thicknesses are substantially equal.

13. The tappet according to claim 12, wherein the mold formed in step c1) is further configured to form a body such that the body further comprises control edges for controlling flow of a fluid through a slide valve, which control edges are positioned between the at least one intermediate segment of the body and the end segments of the body; and the tappet molded in step c5) further comprises control edges for controlling flow of a fluid through the slide valve, which control edges are positioned between the at least one intermediate segment of the tappet and the end segments of the tappet.

14. The tappet according to claim 13, wherein the plastic material provided in step c2) comprises one of: polyoxymethylene and the plastic material further comprises fillers.

15. The tappet according to claim 14, wherein the mold formed in step c1) is further configured to form a body such that the body has transitions which transitions join the end segments of the body and the at least two intermediate segments of the body and which transitions have curves; and the tappet molded in step c5) further comprises transitions which transitions join the end segments of the tappet and the at least two intermediate segments of the tappet and which transitions have curves.

16. The tappet according to claim 15, wherein the mold formed in step c1) is further configured to have at least one injection point and to have surfaces that form the curves of the transitions of the body which the mold is configured to form, the at least one injection point being positioned in the vicinity of the surfaces of the mold that form the curves of the transitions of the body which the mold is configured to form.

17. The tappet according to claim 16, wherein the fillers comprise at least one of: silicon, Teflon and molybdenum sulfide.

18. The tappet according to claim 17, wherein the fillers comprise one of: 0–15% silicon and 0–50% Teflon.

19. The tappet according to claim 18, wherein the injection molding machine provided in step b) is an injection molding machine for flashless molding;

the mold provided in step c1) is further configured such the body formed in the mold has no flash; and step c5) of operating the injection molding machine comprises operating the injection molding machine to mold the tappet such that the tappet has no flash.

20. The tappet according to claim 19, wherein the mold formed in step c1 is further configured to form a body such that:

the at least one intermediate segment of the body comprises two intermediate segments of the body;

the body has a central segment between the two intermediate segments of the body, the central segment being cylindrical, the central segment being coaxial with the end segments, the central segment having a wall which wall has a thickness which thickness is substantially the sum of the thickness of the wall of one of the intermediate segments of the body and the thickness of the wall of one of the end segments of the body;

each of the walls of the two intermediate segments of the body has an inner surface and an outer surface;

each of the walls of the end segments of the body has an inner surface and an outer surface;

the wall of the central segment of the body has an inner surface and an outer surface;

the control edges of the body comprise outer transitional surfaces joining the outer surfaces of the walls of the two intermediate segments of the body and the outer surfaces of the walls of the end segments of the body, and the control edges of the body further comprise outer transitional surfaces joining the outer surfaces of the walls of the two intermediate segments of the body and the outer surface of the wall of the central segment of the body;

each of the outer transitional surfaces of the body comprises a first annular surface, a second annular surface and a third annular surface, the first annular surface joining the outer surface of the wall of one of the two intermediate segments of the body and the second annular surface, the second annular surface joining the first annular surface and the third annular surface, the third annular surface of one of the outer transitional surfaces of the body joining the second annular surface and one of: the outer surface of the wall of one of the end segments of the body and the outer surface of the wall of the central segment of the body, the first annular surface having an inner edge and an outer edge, the inner edge of the first annular surface having a diameter, the outer edge of the first annular surface having a diameter, the diameter of the outer edge of the first annular surface being greater than the diameter of the inner edge of the first annular surface, the inner edge of the first annular surface being adjacent to the outer surface of the wall of one of the two intermediate segments of the body, and the first annular surface extending radially outward at an angle of approximately 90° from the outer surface of the wall of the one of the two intermediate segments of the body, the second annular surface having an inner edge and an outer edge, the inner edge of the second annular surface having a diameter, the outer edge of the second annular surface having a diameter, the diameter of the outer edge of the second annular surface being greater than the diameter of the inner edge of the second annular surface, the inner edge of the second annular surface being adjacent to the outer edge of the first annular surface, the second annular surface not overlapping the first annular surface, and the second annular surface being inclined substantially 50° from the first annular surface, and the third annular surface having an inner edge and an outer edge, the inner edge of the third annular surface having a diameter, the outer edge of the third annular surface having a diameter, the diameter of the outer edge of the third annular surface being greater than the diameter of the inner edge of the third annular surface, the inner edge of the third annular surface being adjacent to the outer edge of the second annular surface, the third annular surface being curved and convex, the third annular surface at the inner edge of the third annular surface being parallel to the second annular surface, and the third annular surface at the outer edge of the third annular surface being parallel to one of: the outer surface of the wall of the one of the end segments of the body and the outer surface of the wall of the central segment of the body; the body has a longitudinal axis;

the body has a length along the longitudinal axis of the body;

the hollow interior space of the body extends over the entire length of the body;

the body has inner transitional surfaces joining the inner surfaces of the walls of the two intermediate segments of the body and the inner surfaces of the walls of the end segments of the body;

each of the inner transitional surfaces of the body comprises a first portion and a second portion, the first portion joining the inner surface of the wall of the one of the two intermediate segments of the body and the second portion, the second portion joining the first portion and the inner surface of the wall of one of the end segments of the body, the first portion being curved and convex, the first portion having a first edge and a second edge, the first edge of the first portion being adjacent to the inner surface of the wall of the one of the two intermediate segments of the body, and the first portion at the first edge of the first portion being parallel to the inner surface of the wall of the one of the two intermediate segments of the body, and the second portion being curved and concave, the second portion having a first edge and a second edge, the first edge of the second portion being adjacent to the second edge of the first portion, the second portion at the first edge of the second portion being substantially aligned with the first portion, the second edge of the second portion being adjacent to the inner surface of the wall of the one of the end segments of the body, and the second portion at the second edge of the second portion being substantially aligned with the inner surface of the wall of the one of the end segments of the body;

the body has chamfers at the ends of the body on the outer surfaces of the walls of the end segments of the body which chamfers are inclined substantially 15° from the outer surfaces of the walls of the end segments of the body, and which chamfers extend a distance from the ends of the body which distance is substantially equal to the thickness of one of the end segments of the body;

the inner surface of the wall of the central segment of the body has a diameter, the inner surfaces of the walls of the two intermediate segments of the body have diameters which diameters are substantially equal to one another and are substantially equal to the diameter of the inner surface of the wall of the central segment of the body;

each of the end segments of the body has a length along the longitudinal axis of the body;

each of the end segments of the body has an end adjacent to one of the inner transitional surfaces of the body and an end at one of the ends of the body; and the wall of each of the end segments of the body has a convex thickening on the inner surface of the wall of the end segment which thickening begins at the end of the end segment adjacent to one of the inner transitional surfaces of the body and which thickening extends approximately one fourth of the length of the end segment toward the end of the end segment at one of the ends of the body; and the tappet molded in step c5 is molded such that:

the at least one intermediate segment of the tappet comprises two intermediate segments of the tappet;

the tappet comprises a central segment between the two intermediate segments of the tappet, the central segment being cylindrical, the central segment being coaxial with the end segments, the central segment having a wall which wall has a thickness which thickness is substantially the sum of the thickness of the wall of one of the intermediate segments of the tappet and the thickness of the wall of one of the end segments of the tappet;

each of the walls of the two intermediate segments of the tappet has an inner surface and an outer surface;

each of the walls of the end segments of the tappet has an inner surface and an outer surface;

the wall of the central segment of the tappet has an inner surface and an outer surface;

the control edges of the tappet comprise outer transitional surfaces joining the outer surfaces of the walls of the two intermediate segments of the tappet and the outer surfaces of the walls of the end segments of the tappet, and the control edges of the tappet further comprise outer transitional surfaces joining the outer surfaces of the walls of the two intermediate segments of the tappet and the outer surface of the wall of the central segment of the tappet;

each of the outer transitional surfaces of the target comprises a first annular surface, a second annular surface and a third annular surface, the first annular surface joining the outer surface of the wall of one of the two intermediate segments of the tappet and the second annular surface, the second annular surface joining the first annular surface and the third annular surface, the third annular surface of one of the outer transitional surfaces of the tappet joining the second annular surface and one of: the outer surface of the wall of one of the end segments of the tappet and the outer surface of the wall of the central segment of the tappet, the first annular surface having an inner edge and an outer edge, the inner edge of the first annular surface having a diameter, the outer edge of the first annular surface having a diameter, the diameter of the outer edge of the first annular surface being greater than the diameter of the inner edge of the first annular surface, the inner edge of the first annular surface being adjacent to the outer surface of the wall of one of the two intermediate segments of the tappet, and the first annular surface extending radially outward at an angle of approximately 90° from the outer surface of the wall of the one of the two intermediate segments of the tappet, the second annular surface having an inner edge and an outer edge, the inner edge of the second annular surface having a diameter, the outer edge of the second annular surface having a diameter, the diameter of the outer edge of the second annular surface being greater than the diameter of the inner edge of the second annular surface, the inner edge of the second annular surface being adjacent to the outer edge of the first annular surface, the second annular surface not overlapping the first annular surface, and the second annular surface being inclined substantially 50° from the first annular surface, and the third annular surface having an inner edge and an outer edge, the inner edge of the third annular surface having a diameter, the outer edge of the third annular surface having a diameter, the diameter of the outer edge of the third annular surface being greater than the diameter of the inner edge of the third annular surface, the inner edge of the third annular surface being adjacent to the outer edge of the second annular surface, the third annular surface being curved and convex, the third annular surface at the inner edge of the third annular surface being parallel to the second annular surface, and the third annular surface at the outer edge of the third annular surface being parallel to one of: the outer surface of the wall of the one of the end segments of the tappet and the outer surface of the wall of the central segment of the tappet;

the tappet has a longitudinal axis;

the tappet has a length along the longitudinal axis of the tappet;

the hollow interior space of the tappet extends over the entire length of the tappet;

the tappet has inner transitional surfaces joining the inner surfaces of the walls of the two intermediate segments of the tappet and the inner surfaces of the walls of the end segments of the tappet;

each of the inner transitional surfaces of the tappet comprises a first portion and a second portion, the first portion joining the inner surface of the wall of the one of the two intermediate segments of the tappet and the second portion, the second portion joining the first portion and the inner surface of the wall of one of the end segments of the tappet, the first portion being curved and convex, the first portion having a first edge and a second edge, the first edge of the first portion being adjacent to the inner surface of the wall of the one of the two intermediate segments of the tappet, and the first portion at the first edge of the first portion being parallel to the inner surface of the wall of the one of the two intermediate segments of the tappet, and the second portion being curved and concave, the second portion having a first edge and a second edge, the first edge of the second portion being adjacent to the second edge of the first portion, the second portion at the first edge of the second portion being substantially aligned with the first portion, the second edge of the second portion being adjacent to the inner surface of the wall of the one of the end segments of the tappet, and the second portion at the second edge of the second portion being substantially aligned with the inner surface of the wall of the one of the end segments of the tappet;

the tappet has chamfers at the ends of the tappet on the outer surfaces of the walls of the end segments of the tappet which chamfers are inclined substantially 15° from the outer surfaces of the walls of the end segments of the tappet, and which chamfers extend a distance from the ends of the tappet which distance is substantially equal to the thickness of one of the end segments of the tappet;

the inner surface of the wall of the central segment of the tappet has a diameter, the inner surfaces of the walls of the two intermediate segments of the tappet have diameters which diameters are substantially equal to one another and are substantially equal to the diameter of the inner surface of the wall of the central segment of the tappet;

each of the end segments of the tappet has a length along the longitudinal axis of the tappet;

each of the end segments of the tappet has an end adjacent to one of the inner transitional surfaces of the tappet and an end at one of the ends of the tappet; and the wall of each of the end segments of the tappet has a convex thickening on the inner surface of the wall of the end segment which thickening begins at the end of the end segment adjacent to one of the inner transitional surfaces of the tappet and which thickening extends approximately one fourth of the length of the end segment toward the end of the end segment at one of the ends of the tappet.

* * * * *

UNITED STATES PATENT AND TRADEMARK OFFICE
CERTIFICATE OF CORRECTION

PATENT NO.  : 5,293,685
DATED       : March 15, 1994
INVENTOR(S) : Hans-Friedrich MEYER and Ernst August MEYER It is certified that error appears in the above-indentified patent and that said Letters Patent is hereby corrected as shown below:

On the title page, item [30], after 'Sep.', delete "19," and insert --20--.

In column 14, line 6, Claim 14, after 'and' insert --polyamide; and--.

Signed and Sealed this

Thirty-first Day of December, 1996

Attest:

BRUCE LEHMAN

*Attesting Officer*       *Commissioner of Patents and Trademarks*